United States Patent
Wang et al.

(10) Patent No.: US 10,761,545 B2
(45) Date of Patent: Sep. 1, 2020

(54) LOW-PRESSURE AND LOW-ENERGY SELF-REGULATING VALVE

(71) Applicants: Massachusetts Institute of Technology, Cambridge, MA (US); Jain Irrigation Systems Ltd, Jalgaon (IN)

(72) Inventors: Ruo-Qian Wang, Berkeley, CA (US); Amos G. Winter, Somerville, MA (US); Abhijit Bhaskar Joshi, Jalgaon (IN); Pawel Jerzy Zimoch, Cambridge, MA (US)

(73) Assignees: Massachusetts Institute of Technology, Cambridge, MA (US); Jain Irrigation Systems Ltd, Jalgaon (IN)

( * ) Notice: Subject to any disclaimer, the term of this patent is extended or adjusted under 35 U.S.C. 154(b) by 0 days.

(21) Appl. No.: 16/376,574

(22) Filed: Apr. 5, 2019

(65) Prior Publication Data
US 2019/0332128 A1    Oct. 31, 2019

Related U.S. Application Data

(63) Continuation of application No. 15/320,877, filed as application No. PCT/US2016/062474 on Nov. 17, 2016, now Pat. No. 10,254,770.
(Continued)

(51) Int. Cl.
*F16K 31/126*    (2006.01)
*G05D 7/01*    (2006.01)
(Continued)

(52) U.S. Cl.
CPC ............ *G05D 7/0113* (2013.01); *A01G 25/02* (2013.01); *F16L 55/05* (2013.01); *F16L 55/055* (2013.01)

(58) Field of Classification Search
CPC ...... G05D 7/0113; F16L 55/055; F16L 55/05; A01G 25/02
(Continued)

(56) References Cited

U.S. PATENT DOCUMENTS

| 2,904,063 A | ‡ | 9/1959 | Wall | ................ G05D 7/012 137/392 |
| 3,078,675 A | ‡ | 2/1963 | Baldwin | ............ F16K 7/075 137/486 |

(Continued)

FOREIGN PATENT DOCUMENTS

WO    2017087638 A1    5/2017

OTHER PUBLICATIONS

International Search Report and the Written Opinion for PCTIUS2016/062474 dated Feb. 21, 2017.‡
(Continued)

*Primary Examiner* — Minh Q Le
(74) *Attorney, Agent, or Firm* — Hamilton, Brook, Smith & Reynolds, P.C.

(57) ABSTRACT

A passive, self-regulating valve includes a static pressure chamber and an elastically collapsible tube supported within the static pressure chamber. The elastically collapsible tube is defined by a geometry that determines an activation pressure of the valve. The passive, self-regulating valve also includes a flow restrictor in fluid communication with the elastically collapsible tube inside the static pressure chamber, as well as piping connecting a source of pressurized liquid both to the flow restrictor and to an opening into the static pressure chamber. The piping enables the flow restrictor to control flow rate of the pressurized liquid through the valve independent of the activation pressure of the valve. In a preferred embodiment, the flow restrictor is a needle valve.

14 Claims, 6 Drawing Sheets

Related U.S. Application Data

(60) Provisional application No. 62/257,937, filed on Nov. 20, 2015.

(51) Int. Cl.
    *A01G 25/02* (2006.01)
    *F16L 55/05* (2006.01)
    *F16L 55/055* (2006.01)

(58) Field of Classification Search
    USPC ..... 137/488, 7, 8, 118.07, 119.08, 451, 461, 137/466, 475; 251/4, 5, 28, 29, 50, 343, 251/344
    See application file for complete search history.

(56) References Cited

U.S. PATENT DOCUMENTS

| | | | | |
|---|---|---|---|---|
| 3,429,549 | A ‡ | 2/1969 | Swanson | A61M 39/28 24/115 R |
| 3,624,801 | A ‡ | 11/1971 | Gannon | F16K 7/075 251/5 |
| 3,640,354 | A ‡ | 2/1972 | Rassieur | E21B 27/00 166/326 |
| 3,918,674 | A ‡ | 11/1975 | Sutter | F16K 31/365 251/5 |
| 4,256,130 | A * | 3/1981 | Smith | F16K 7/075 137/1 |
| 5,158,230 | A ‡ | 10/1992 | Curran | F24F 13/10 236/49.4 |
| 5,535,983 | A ‡ | 7/1996 | Hohermuth | F16K 7/07 251/4 |
| 5,671,774 | A ‡ | 9/1997 | Klein | F16K 7/075 137/486 |
| 5,819,801 | A ‡ | 10/1998 | Palffy | F16L 55/04 137/826 |
| 6,189,857 | B1 ‡ | 2/2001 | Zeger | F16K 7/075 137/355.18 |
| 6,572,259 | B2 * | 6/2003 | Burnett | F04B 15/02 251/5 |
| 6,575,425 | B1 * | 6/2003 | Betz | F16K 7/07 251/175 |
| 7,118,086 | B1 ‡ | 10/2006 | Borglum | F16K 7/07 251/5 |
| 7,665,713 | B1 ‡ | 2/2010 | Clark | F16K 7/075 251/4 |
| 10,254,770 | B2 | 4/2019 | Wang et al. | |
| 2008/0083889 | A1 * | 4/2008 | Raftis | F16K 7/07 251/5 |
| 2011/0186757 | A1 ‡ | 8/2011 | Kawamura | B67C 3/28 251/5 |
| 2015/0267822 | A1 ‡ | 9/2015 | Nissen | F16K 7/07 251/5 |
| 2018/0246530 | A1 | 8/2018 | Wang et al. | |

OTHER PUBLICATIONS

Cancelli, C. and Pedley, J., "A separated-flow model for collapsible-tube oscillations," J. Fluid Mech., (157) 375-404, (1985).

Hadzismajlovic, D.E. and Bertram, C.D., "Collapsible-tube pulsation generator for crossflow microfiltration: fatigue testing of silicone-rubber tubes," Journal of Applied Polymer Science, (61) 703-713, (1996).

Heil, M. and Waters, S., "Transverse flows in rapidly oscillating elastic cylindrical shells," J. Fluid Mech., (547) 185-214 (2006).

Shamshery, P., "Validated analytical model of a pressure compensation drip irrigation emitter," American Physical Society, APS Physics: 68th Annual Meeting of the APS Division of Fluid Dynamics, 60(21), (2015).

Wang et al., "A novel bio-inspired pressure compensating emitter for low-cost drip irrigation systems," Proceedings Paper Formatting Instructions, (2015).

Wang, R. Q. and Winter, A. G., "A respiratory airway-inspired low-pressure, self-regulating valve for drip irrigation," APS Division of Fluid Dynamics, http://adsabs.harvard.edu/abs/2015APS..DFDA14001W, (2015).

Weaver, D.S., and Paidoussis, M.P., "On collapse and flutter phenomena in thin tubes conveying fluid," Journal of Sound and Vibration, 50(1), 117-132, (1977).

Whittaker et al., "Predicting the onset of high-frequency self-excited oscillations in elastic-walled tubes," The Royal Society, Proc. R. Soc. A, http://rspa.royalsocietypublishing.org, (2010).

Notification Concerning Transmittal of International Preliminary Report on Patentability (Chapter I of the Patent Cooperation Treaty), for International Application No. PCT/US2016/062474, entitled: "Low-Pressure and Low-Energy Self-Regulating Valve," dated: May 31, 2018 (8 pgs).

The International Search Report and the Written Opinion for PCT/US2016/062474 dated Feb. 21, 2017.

Morgan et al. "A mathematical model of flow through a collapsible tube-I. Model and steady flow results", Journal of Biomechanics, 1989. pp. 1263-1270, vol. 22, No. 11-12, Pergamon Press, New York, NY, US.

Patterson and Starling, "On the mechanical factors which determine the output of the ventricles". The Journal of Physiology, 1914, pp. 357-379, vol. 48(5).

Zimoch et al. "Bio-inspired, low-cost, self-regulating valves for drip irrigation in developing countries". 25th International Conference on Design Theory and Methodology, 2013, p. V005T06A040, vol. 5.

Bertram, "Experimental studies of col lapsible tubes". Flow Past Highly Compliant Boundaries and in Collapsible Tubes, 2003, pp. 51-65.

Grotberg and Jensen. "Biofluid mechanics in flexible tubes". Annual Review of Fluid Mechanics, Jan. 2004, pp. 121-147, vol. 36(1).

Heil and Hazel "Fluid-Structure Interaction in Internal Physiological Flows". Annual Review of Fluid Mechanics, Jan. 2011, pp. 141-162, vol. 43(1).

Brower and Noordergraaf. "Pressure-flow characteristics of collapsible tubes: A reconciliation of seemingly contradictory results". Annals of Biomedical Engineering, Mar. 1973, pp. 333-355, vol. 1(3).

Gavriely et al. "Flutter in flow limited collapsible tubes: a mechanism for generation of wheezes". Journal of Applied Physiology, 1989, pp. 2251-2261, vol. 66(5).

Bertram and Castles. "Flow limitation in uniform thick-walled collapsible tubes". Journal of Fluids and Structures, 1999, pp. 399-418, vol. 13(3).

Bertram and Elliott. "Flow-rate limitation in a uniform thin-walled collapsible tube, with comparison to a uniform thick-walled tube and a tube of tapering thickness". Journal of Fluids and Structures, Mar. 2003, pp. 541-559, vol. 17(4).

Bertram and Chen. "Aqueous flow limitation in a tapered-stiffness collapsible tube". Journal of Fluids and Structures, Nov. 2000, pp. 1195-1214, vol. 14(8).

Bertram and Tscherry, "The onset of flow-rate limitation and flow induced oscillations in collapsible tubes". Journal of Fluids and Structures, Nov. 2008, pp. 1029-1045, vol. 22(8).

Low and Chew, "Pressue/flow relationships in collapsible tubes: effects of upstream pressue fluctuations". Medical and Biological Engineering and Computing, 1991, pp. 217-221, vol. 29.

Low et al."Pressue/flow behaviour in collapsible tube subjected to forced downstream pressure fluctuations", Medical and Biological Engineering and Computing, 1995, pp. 545-550, vol. 33(4).

Walsh et al. "Measurement of wall deformation and flow limitation in a mechanical trachea", Journal of Biomechanical Engineering, Oct. 2007, p. 146, vol. 117(1).

Bertram et al. "Mapping of instabillities for flow through collapsed tubes of differing length". Journal of Fluids and Structures, 1990, pp. 125-153, vol. 4(2).

Shapiro, "Steady flow in collapsible tubes". Journal of Biomechanical Engineering, 1997, p. 126, vol. 99(3).

Flaherty et al. "Post buckling behavior of elastic tubes and rings with opposite sides in contact". SIAM Journal on Applied Mathematics, 1972, pp. 446-455, vol. 23(4).

(56) References Cited

OTHER PUBLICATIONS

Notice of Allowance for U.S. Appl. No. 15/320,877 dated Dec. 18, 2018, 19 pages.

\* cited by examiner
‡ imported from a related application

LOW-PRESSURE AND LOW-ENERGY SELF-REGULATING VALVE

RELATED APPLICATIONS

This application is a continuation of U.S. application Ser. No. 15/320,877, filed Dec. 21, 2016, which is the U.S. National Stage of International Application No. PCT/US2016/062474, filed on Nov. 17, 2016, published in English, which claims priority to U.S. provisional application Ser. No. 62/257,937, filed Nov. 20, 2015, the contents of which are incorporated herein by reference.

BACKGROUND OF THE INVENTION

This invention relates to a self-regulating valve allowing independent control of flow rate and activation pressure for use in an irrigation system.

Drip irrigation is a means of reducing the water required to irrigate by up to 60%, and it has been shown to be a successful development strategy enabling poor farmers to rise out of poverty by growing more and higher value crops. The barrier to drip irrigation achieving large-scale dissemination is the cost of the pump and power system. The power consumption is equal to the product of flow rate and pressure. For a given farm, the flow rate is predetermined by the type of the crop; the primary opportunity to reduce the power consumption is to lower pumping pressure.

Pressure compensation is a means of maintaining a constant flow rate from a drip emitter under varying applied pressure—an important feature for a low pressure dripper network where pressure from the pump to the end of the line can vary by a factor of three.

SUMMARY OF THE INVENTION

The self-regulating valve of the invention includes a static pressure chamber and an elastically collapsible tube supported within the static pressure chamber. By static pressure is meant a fluid maintained at a selected static pressure in the chamber. A flow restrictor is in fluid communication with the collapsible tube inside the static pressure chamber and piping is provided connecting a source of pressurized liquid both to the flow restrictor and to an opening into the static pressure chamber, whereby flow rate through the valve remains substantially constant with variations in pressure of the pressurized liquid. In a preferred embodiment of the invention, the flow restrictor is a needle valve.

DESCRIPTION OF THE PREFERRED EMBODIMENT

Figure 1:
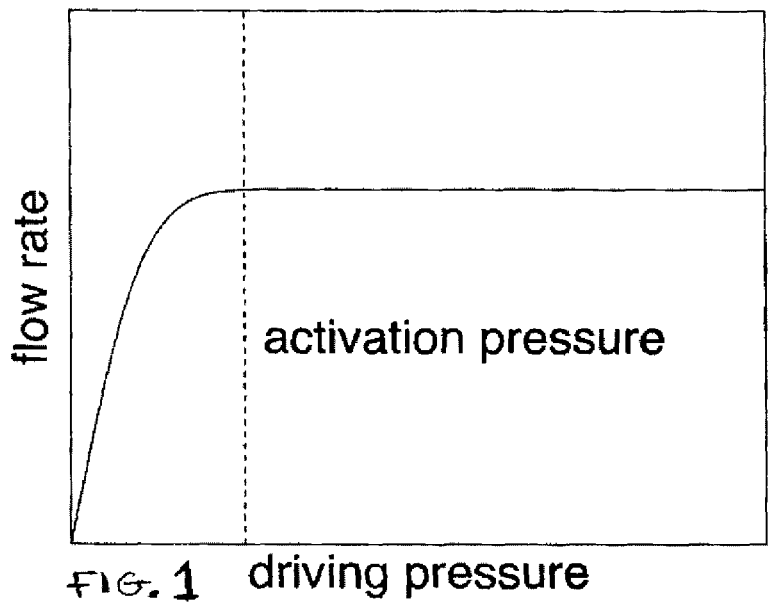
FIG. 1 is a graph of flow rate against driving pressure illustrating the activation pressure.

A novel design of a low-energy, passive self-regulating pressure compensating valve with a single pressure source is disclosed for drip irrigation. Pressure compensation is a mechanism that sustains a flow at constant flow rate regardless of the driving pressure. The minimum driving pressure that initiates the pressure compensation is called the "activation pressure" (FIG. 1). Activation pressure is key to pumping power—since the power is proportional to the product of flow rate and pressure, the activation pressure dictates the minimum maintaining pressure of the system and thus determines the lowest pumping power, given a fixed flow rate. Compared with existing products, this design can reach an extremely low activation pressure using a flexible tube architecture.

Figure 2A:
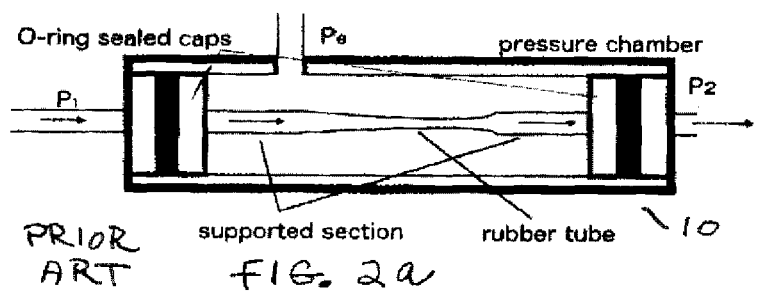
FIG. 2a is a cross-sectional view of a prior art Starling resistor.

The valve design disclosed herein was inspired by the phenomenon of flow limitation in a Starling resistor. A Starling resistor is a device consisting of an elastically collapsible tube mounted inside a static pressure chamber as shown in FIG. 2a. The key parameters of the configuration include the upstream pressure ($P_1$), the downstream pressure ($P_2$) and the external pressure ($P_e$). If $P_{1e}=P_1-P_e$ was kept constant, the flow rate would not continue to rise with the pressure ($P_{12}=P_1-P_2$). This phenomenon is called "flow limitation". Strictly speaking, the pressure compensation (the flow rate keeps constant) is a special case of flow limitation (the flow rate stops increasing). However, in an industrial application, flow limitation functions to restrict the flow for the irrigation purpose (e.g. [2]), so we will focus on flow limitation and redefine activation pressure as the minimum pressure at which flow limitation occurs.

Studies on the flow inside flexible tubes are numerous [3-5]. Early flow limitation work was summarized and reproduced by [6]. They confirmed that flow limitation behavior can be affected by tube geometry, and formed an empirically-derived relationship to predict flow rate versus inlet pressure behavior. Recent investigations have typically focused on one or more particular factors of flexible tube flow: the effect of the tube wall thickness was studied with thick-wall tubes [7, 8], thin-wall tubes [9], and taper-wall tubes [10]; the effect of material was investigated using Penrose rubber [6] and Latex/Silastic rubber [7]; the effect of fluid viscosity was examined by [11]; and other investigated factors have included the periodic variation of the upstream and downstream flow rates [12, 13] and testing square-shaped cross-sections [14]. In conventional Starling resistors, the activation pressure and flow rate are determined by the nonlinear interplay of these factors, and there is no easy way to separately control them. To address this issue, the present study investigates the Starling resistor architecture in FIG. 2, which enables full control of flow rate via the needle valve, without changing activation pressure.

To fully control the flow limitation, a reliable theoretical model is also required to guide the design of the new valve. The major obstacle in developing such a model is the lack of systematic understanding of the flow limitation dynamics. First, as mentioned above, the flow limitation is affected by many factors, and the studies on these factors are scattered in different publications. Because the availability of information among different publications is not consistent, a comparative review of the flow dynamics is difficult to perform. Second, self-excited oscillation of the flexible tube is usually observed in flow limitation, but it is not clear whether it causes the tube to collapse or the tube collapse causes the oscillation. These difficulties prevent an accurate prediction of the onset of the flow limitation that determines the activation pressure and the flow rate, and thus, no previous theoretical model could be developed to quantitatively match the experimental results.

Figure 2B:
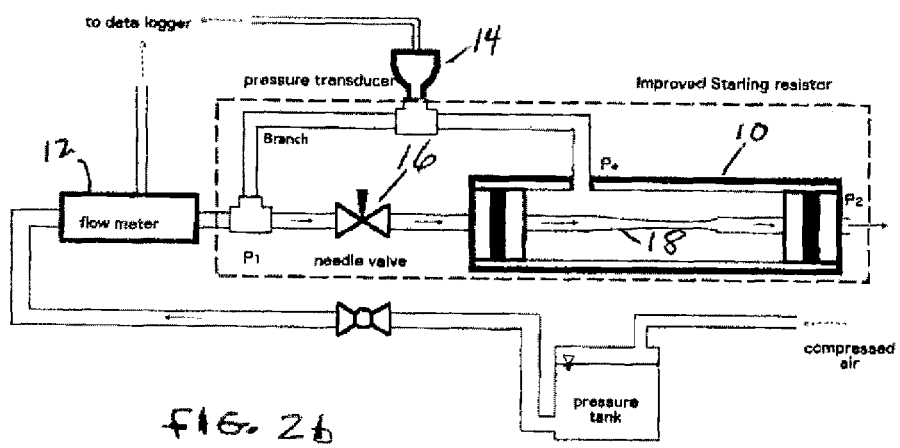
FIG. 2b is a cross-sectional, schematic illustration of an improved Starling resistor architecture as disclosed herein.

The experimental setup included a pressure supply, a measurement system and a modified Starling resistor (FIG. 2b). The whole system was driven by static pressure from a pressure tank, which was pressurized by compressed air and controlled by a pressure regulator. The pressure could range from 0 to 200 kPa (0-2 bar). The pressure tank was connected to the Starling resistor 10 through a high-resolution rotor flow meter 12 (Seametrics stainless single-jet meter SES-050-13) with a measurement range of 6.3-630 mL/s (0.1-10 gallons per minute). A branch was installed downstream of the flowmeter to pressurize the Starling resistor 10 chamber and a pressure transducer 14 (Setra model 209 with a measurement range of 0-172 kPa) was installed at the branch to monitor the pressure. Since the water could be treated as static in the branch and in the chamber, the measurement of the transducer was equal to the pressure at the T-junction point at the beginning of the branch, which was also equal to the pressure in the chamber. The pressure transducer and the flow meter were connected to a data logger to record the real-time signal with a sampling rate of 2000 Hz.

In the Starling resistor 10, two sets of O-ring sealed caps were manufactured with different barb-fittings to mount different diameter rubber tubes. Two pressure chambers were used to vary the length of the tube. Different from the original Starling resistor design, we introduced a needle valve 16 (Swagelok Integral Bonnet Needle Valve, ¼ inch diameter, requiring 9.5 turns to fully close) after the branch and before the pressure chamber. We performed a series of experiments on this test platform with various commercial-available latex rubber tubes 18. We varied the following parameters: the inner diameter, the unsupported length and the wall thickness of the tube. The average Young's Modulus (E) of 1.96 MPa was provided by the manufacturer for the extent of stretch. The experimental configurations are detailed in Table 1. Two experimental results extracted from references [8] and [9] are also listed for comparison.

Each case in Table 1 was tested using different needle valve settings, ranging from fully opened to fully closed. Each test had three repeated trials, and the results presented in Section 3 are ensemble-averaged if not claimed otherwise. In each trial, the pressure tank was slowly pressurized from 0 to 200 kPa and then decreased to zero, which are referred to as pressurizing and depressurizing scenarios, respectively. The variable $$K_p = \frac{2Eh^3}{3_{1-v^2}D^3}$$

is a parameter proportional to the bending stiffness of the tube wall, where v is the Poisson's ratio of the material. The nominal wave speed of the tube structure is $$c_0 = \sqrt{\frac{K_p}{\rho}}$$

and $\rho$ is the density of the water (=1000 kg/150 m³ at room temperature).

TABLE 1

Parameters of the experiment

| Case | Inner Diameter D [cm] | Length L [cm] | Wall Thickness h (mm) | Young's Modulus E (MPa) | h/D | $K_p$ (kPa) | $c_0$ (m/s) |
|---|---|---|---|---|---|---|---|
| A | 0.635 | 23.5 | 0.794 | 1.96 | 0.125 | 3.40 | 1.84 |
| B | 0.635 | 31.5 | 0.794 | 1.96 | 0.125 | 3.40 | 1.84 |
| C | 1.27 | 23.5 | 1.59 | 1.96 | 0.125 | 3.40 | 1.84 |
| D | 1.27 | 31.5 | 1.59 | 1.96 | 0.125 | 3.40 | 1.84 |
| E | 0.635 | 23.5 | 1.59 | 1.96 | 0.25 | 27.2 | 5.22 |
| F | 0.635 | 23.5 | 2.38 | 1.96 | 0.375 | 91.9 | 9.59 |
| G | 1.3 | 22.1 | 2.39 | 3.40 | 0.184 | 18.7 | 4.32 |
| H | 1.2 | 122.1 | 1.00 | 3.15 | 0.083 | 1.63 | 1.28 |

The flow limitation results are presented in terms of flow rate versus driving pressure. The pressure is the reading from the pressure transducer 14 and represents the pressure difference from the pressure chamber to the atmosphere. We assume that inside the flexible rubber tube 18 the pressure difference from the end of the unsupported section to the outlet is negligible compared to the pressure change along the unsupported section, so the pressure measurement from the transducer can be considered as the transmural pressure applied at the end of the unsupported tube.

Figure 3A:
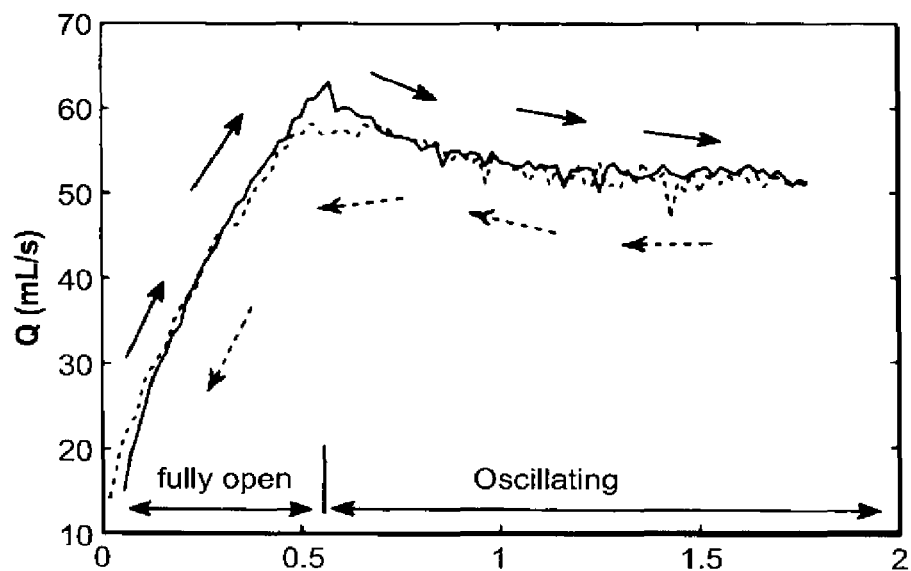
FIGS. 3a and 3b are graphs of flow rate against pressure.
Figure 3B:
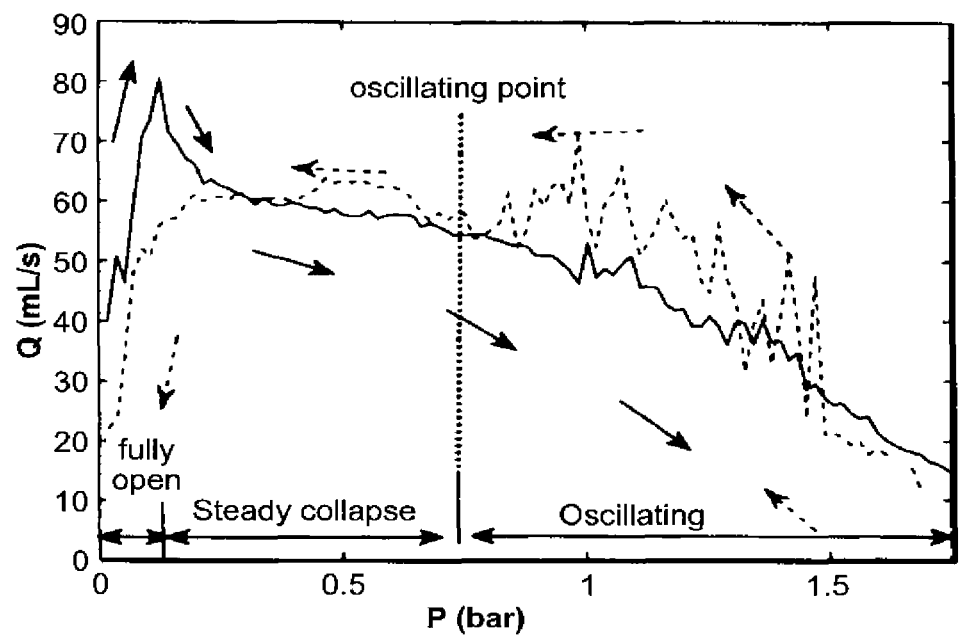

Two flow limitation modes are found and shown in FIGS. 3a and 3b. The results in the figure are original data for a single trial. Each result includes two curves: the solid curve was obtained in the pressurizing scenario, and the dash line is from the depressurizing scenario. The pressure variation process is also shown by the arrows in the figure. The difference between them is due to the hysteresis stemming from the nonlinear tube deformation and the nonlinear flow dynamics.

In FIG. 3a, the flow rate increased with the square root of the pressure at the beginning of the test, following the solid line while the tube had no significant deformation. After reaching the peak, a periodic oscillation suddenly occurred and the flow rate decreased to an approximately constant level. In the depressurizing scenario (dashed line), the flow rate was initially constant and then fell back to the zero point. Oscillation was present until the point that the peak flow rate occurred. After, the magnitude and the frequency of the oscillation decayed. In comparison, the start of the oscillation was sudden, but the stop of the oscillation was a continuous and gradual process. The two curves by the two pressure variation scenarios almost overlapped except around the peak flow rate. This mode of the fluid-structure interaction was commonly observed in small diameter tubes, i.e. in Cases A, B, E and F. In the following discussion, we define activation pressure, $P_a$, as the pressure where the flow rate peaks and $Q_L$ as the approximately constant flow rate in flow limitation. Flow limitation is considered to happen at $P>P_a$ in this mode.

Mode 2 in FIG. 3b is more complex, and was found in Cases C and D. Similar to Mode 1, the flow rate initially increased with the square root of the pressure until reaching $P_a$, with no deformation in the tube cross-section. After the peak, the flow rate dropped gradually, while the tube was steadily squeezed and the cross-sectional area decreased until the flow dropped to the lower limit of the flow meter. In the depressurizing scenario, the flow rate increased abruptly and overshot the pressurizing scenario. The difference in flow rate depended on how quickly the pressure was decreased. The flow rate then fell back to the value of the pressurizing scenario when the oscillation decayed. It followed a lower route to reach the zero point due to hysteresis.

We observed that the flow limitation behavior was dependent on $$\frac{dP}{dt}.$$

To ensure the repeatability of our experiments, we always used the minimum pressure variation rate (~0.03 bar/s) to simulate a quasi-steady state. The trials were conducted until three repeatable cases were recorded, and the following results were obtained by ensemble-averaging the three repeats.

Figure 4A:
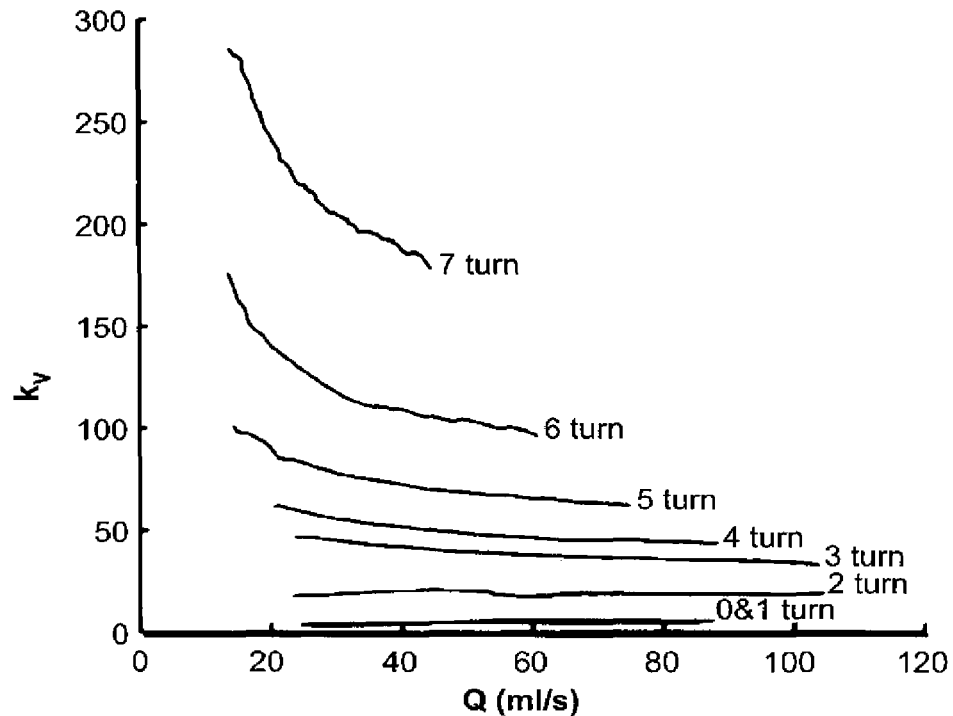
FIG. 4a is a graph of $k_v$ versus flow rate.

The present experiment employed a novel way to induce a transmural pressure by introducing a needle valve, rather than a separate external pressure. The resistance coefficient of the valve was determined by measuring its flow rate at different driving pressures (FIG. 4a), i.e. $k_v=P_v/(\frac{1}{2}\rho u_v^2)$, where $P_v$ is the pressure drop over the valve and $u_v$ is the mean velocity at the inlet of the valve. In the following, we use the nominal resistance coefficient, $k_{vn}$ (the value at 40 ml/s) to indicate the valve opening.

Figure 4B:
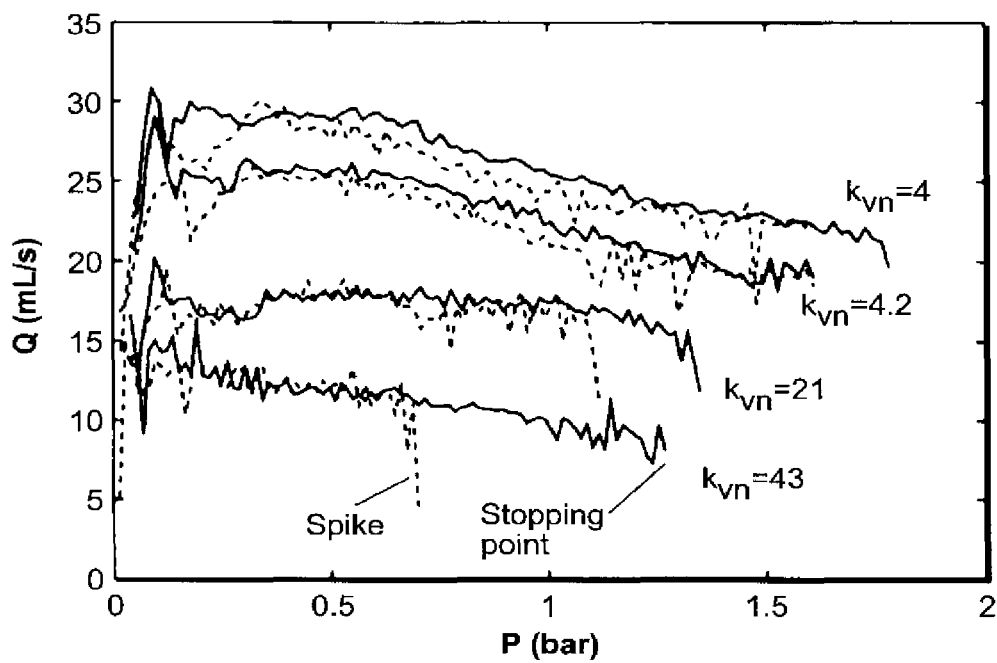
FIG. 4b is a graph of flow rate against pressure showing that changing resistance of the needle valve allows for control of the flow rate independent of the activation pressure.

The effect of the needle valve can be observed by comparing tests with the same flexible tube geometry but different valve openings (FIG. 4b). The limited flow rate $Q_L$ was found to decrease with a small valve opening, while $P_a$ was roughly the same. This insight is a useful characteristic that can separate the control of $P_a$ from $Q_L$. The rubber tube geometry dictates $P_a$, and the flow rate can be changed using the needle valve without affecting $P_a$. This decoupling of $P_a$ and $Q_L$ enables a flexible design of self-regulating Starling resistors. With this knowledge, engineers can design resistors for different applications by first choosing the flexible tube geometry and material for a desired activation pressure, and then an inlet resistance (created by a needle valve, tortuous path, orifice, or other restrictor) to control flow rate.

Another observation about FIG. 4b is that the flexible tube suddenly fully closed at the highest pressure, cutting off the flow. This stopping pressure decreased with smaller valve openings. In the depressurizing scenario, the flow rate had a spike from zero before a flow was initiated, at which point the flexible tube had a sudden opening. The pressure of the spike was also lower than the stopping point due to hysteresis or system bi-stability.

Figure 5A:
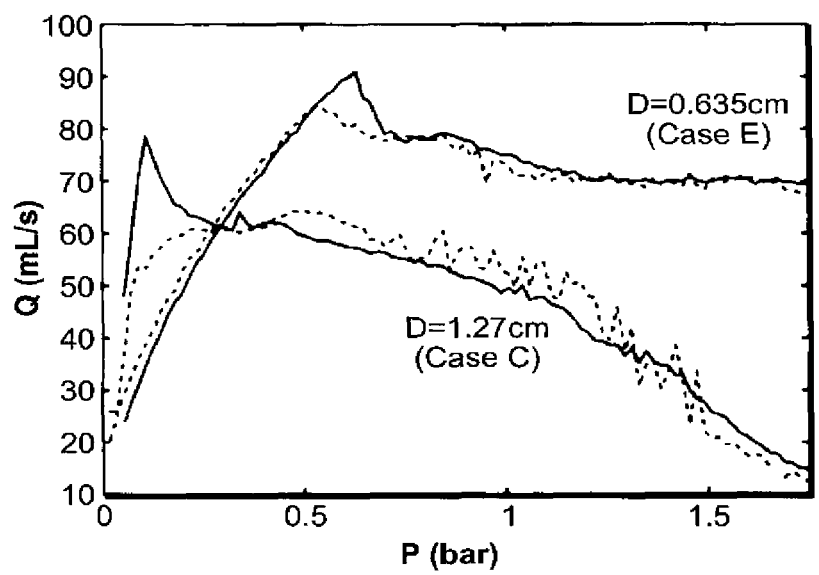
FIG. 5a is a graph of flow rate against pressure for an embodiment of the invention.
Figure 5B:
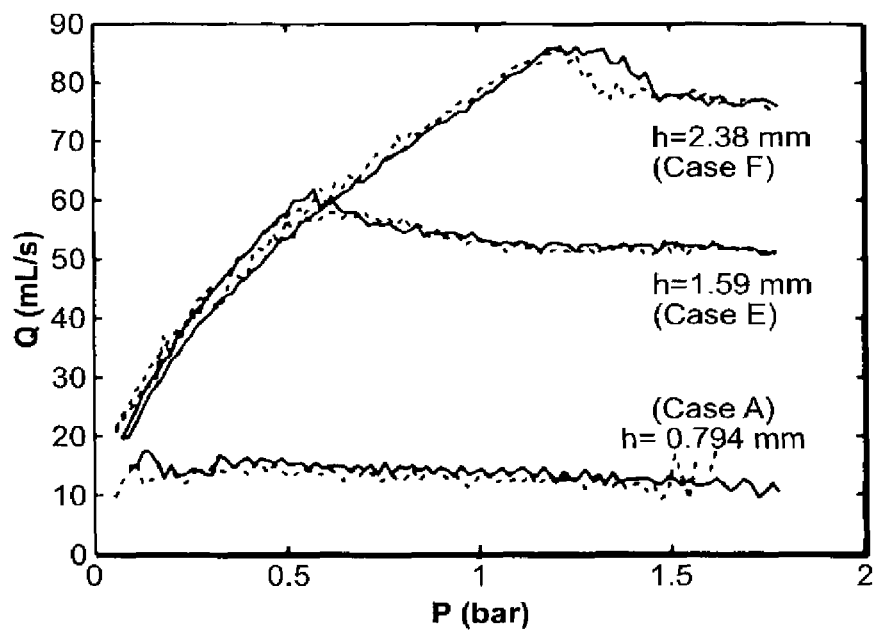
FIG. 5b is a graph of flow rate versus pressure with variations in a tube property such as tube wall thickness.

Comparing cases C and E, we can find the effect of the inner diameter of the flexible tube on flow limitation (FIG. 5a). The major difference introduced by the diameter is the different flow-limitation modes that have been discussed above. In terms of the characteristic parameters, the smaller inner diameter has higher $P_a$ and $Q_L$. Three wall thicknesses (Cases A, E and F) were chosen to show the sensitivity of wall thickness on flow limitation (FIG. 5b). These experiments were performed with the same $k_{vn}=21$. Initial flow rate increases with pressure were similar among these tests. With different wall thicknesses, the flow rate stopped rising at different peak pressures—the thicker wall sustained a higher $P_a$, which resulted in a higher $Q_L$. These results are consistent with our observation of the tube deformation: in the first rising section, the tube remains fully open and circular in shape, thus the initial flow resistance was the same for all three chases due to their identical inner diameters. The thicker wall tube deformed at a higher pressure, because it had a greater bending stiffness and required a stronger transmural pressure to collapse.

Figure 6A:
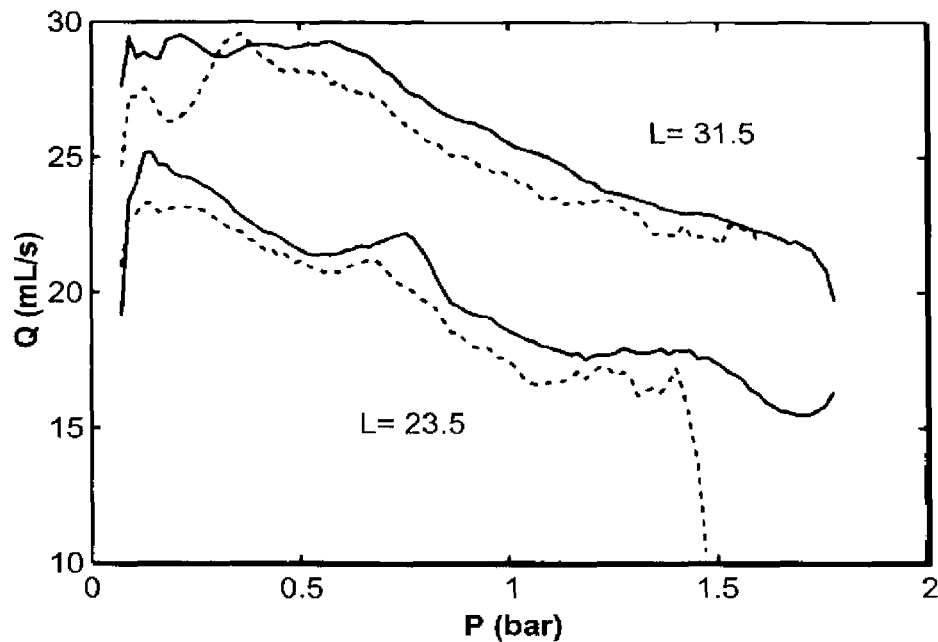
FIGS. 6a and 6b are graphs of flow rate against pressure for tube length variations.
Figure 6B:
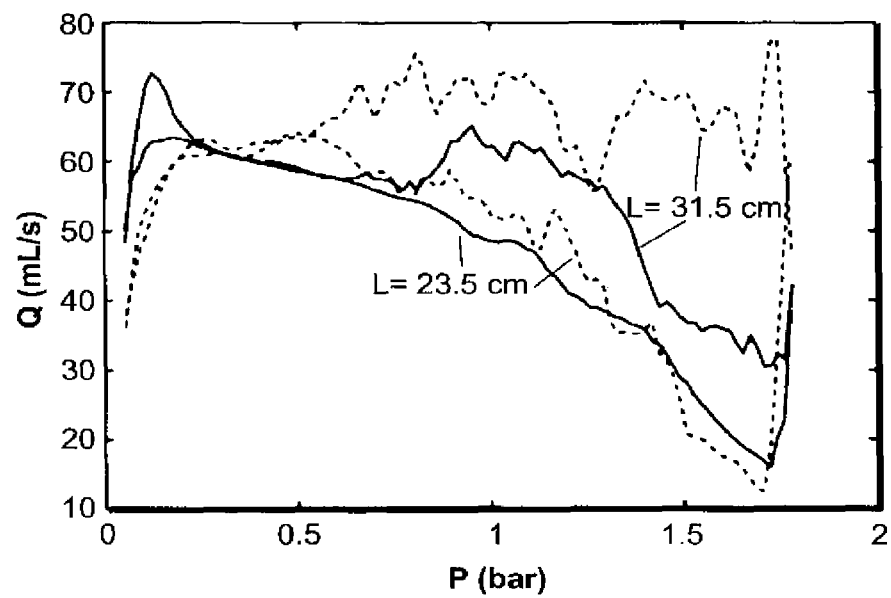

The effect of flexible tube length on Starling resistors was studied previously, focusing on self-excited oscillation [15], but to the authors' knowledge, the present study is the first exploration of its effect on flow limitation. FIG. 6 shows the length effect with different tube diameters. Comparing cases A and B with $k_{vn}=4$ (FIG. 6a), the longer tube had a higher flow rate in the oscillation stage. In comparison with the large diameter tubes with $k_{vn}=21$ (FIG. 6b), the shorter tube had a higher flow rate at $P_a$, but the longer tube had a higher mean flow rate after the self-excited oscillation started. In the depressurizing scenario, the longer tube followed a much higher flow rate until reaching the oscillation onset point, where the two pressure-decreasing curves converged. This observation shows that the length can only change the flow rate after the start of the self-excited oscillation.

To guide the design of Starling resistors with variable inlet restriction, a theoretical model was developed to predict the activation pressure $P_a$ and the limited flow rate $Q_L$. As [4] reported, no previous mathematical model can quantitatively predict experimental results for Starling resistors. With a focus on the control of flow limitation, we make an effort to develop a lumped-parameter model to capture the trend and the magnitude of our experimental results. The present model is inspired by the seminal work of [16]. Although this model is only valid for steady state flow, it has a potential to predict $Q_L$ and $P_a$, as they are determined by the onset of self-excited oscillation and the steady state process before it. We found that a modification to Shapiro's model can predict our experimental results.

The deformation of the rubber tube is described by the "tube law", the relationship of the cross-sectional area and the transmural pressure. A theoretical 2-D relationship derived by [16] and [17] obtained a simple fitting formula after the opposite walls of the collapsed tube contact, i.e.

$$\xi=(P_2-P_e)/K_p=(A/A_0)^{-n}-1,$$

or $$A/A_0 = (\xi+1)^{-\frac{1}{n}}, \qquad (1)$$

where A is the averaging cross-sectional area, $A_0$ is the cross-sectional area before the deformation, n is the fitting exponent, and is the dimensionless transmural pressure. The best reported fitting exponent, which captured pressure compensating flow limitation, was n=3/2. The pressure loss from the T-junction to the end of the tube in FIG. 2 is contributed by two components: the resistance of the needle valve and the flexible tube. The pressure loss can be described by $$P_2 - P_e = -\tfrac{1}{2}\rho(k_v u_v^2 + k_t \mu^2), \tag{2}$$

where $u_v$ and $A_v$ are the flow velocity and the cross-sectional area inside the needle valve, u is the average velocity in the flexible tube, $k_v$ is the pressure loss coefficient of the needle valve and $k_t$ is the pressure loss coefficient incurred by the flexible tube.

In mass conservation, we have $$A_v u_v = Au. \tag{3}$$

The cross-sectional area ratio can be estimated by $$\frac{A}{A_v} = \frac{A^{A_0}}{A_0 A_v}.$$

In mode 1 (for small diameter tubes), $A_0 = A_v$ and the flexible tube remains circular in shape at the steady state, so $A \approx A_0$; in mode 2 (for big diameter tubes), $A_0 = 4A_v$ and a significant collapse was observed such that $A < A_0$. Therefore, $$\frac{A}{A_v} = \frac{A^{A_0}}{A_0 A_v} \approx 1$$

and $u_v \approx u$.

With this assumption, Eqn. (2) becomes $$\frac{P_2 - P_e}{K_P} \approx \frac{1 u^2}{2 c_0^2}(k_v + k_t). \tag{4}$$

Using conservation of mass, the flow rate is $$Q = Au. \tag{5}$$

Substituting Eqns. (1) and (3) into (4), one obtains the non-dimensional flow rate $$q = \frac{Q}{A_0 c_0} = \frac{Au}{A_0 c_0} = (\xi + 1)^{-\frac{1}{n}} \left(\frac{2\xi}{k_v + k_t}\right)^{1/2}. \tag{6}$$

To find out the maximum flow rate, we take the derivative of Eqn. (5), and let $d\xi/dq=0$, which leads to $$\xi = n/(2-n). \tag{7}$$

Figure 7A:
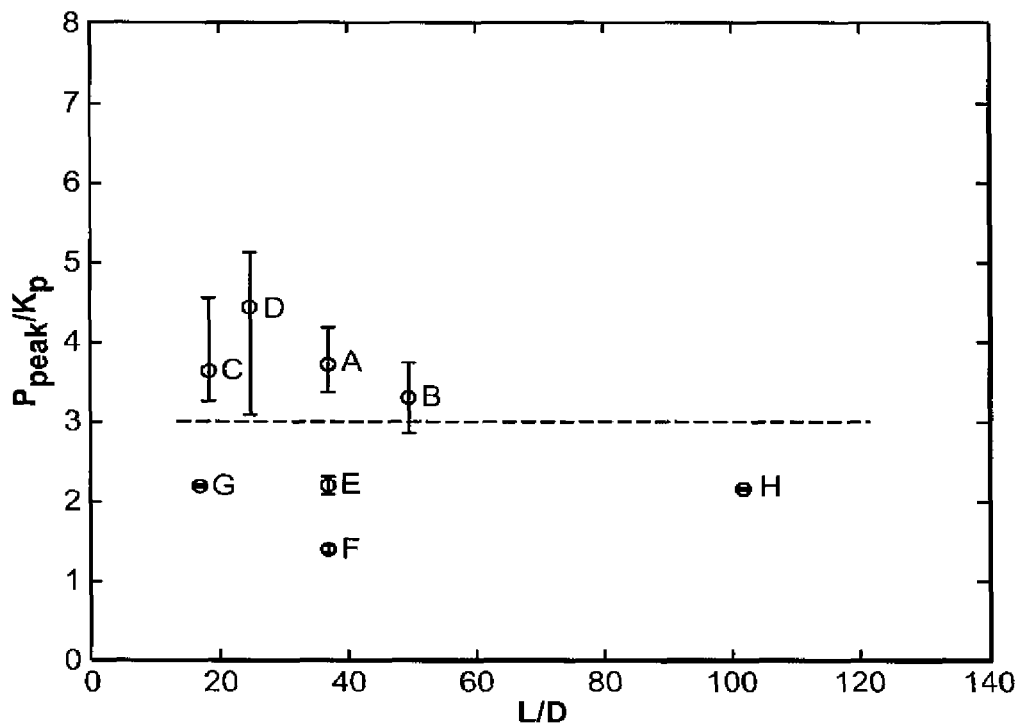
FIG. 7a is a graph showing a comparison of activation pressures from experimental results and from theory.

If n=3/2, the maximum flow rate would occur at =3. Comparing this result with the normalized $P_a$ from case A to E is shown in FIG. 7a. The error bars indicate the upper and lower limits of the activation pressure with different needle valve opening. The prediction by the theoretical model is shown with the dashed line, which goes through the middle of all the results including the cases from the literature (Cases G and H). The mean value of all the data is 3.28, which is close to our estimation of 3.

Substituting Eqn. (6) into (5), we obtain an expression for the maximum flow rate, $$q_L = \frac{Q_L}{A_0 c_0} = \left(\frac{2}{2-n}\right)^{-\frac{1}{n}} \left(\frac{2n}{k_v + k_t 2 - n}\right)^{1/2}. \tag{8}$$

Figure 7B:
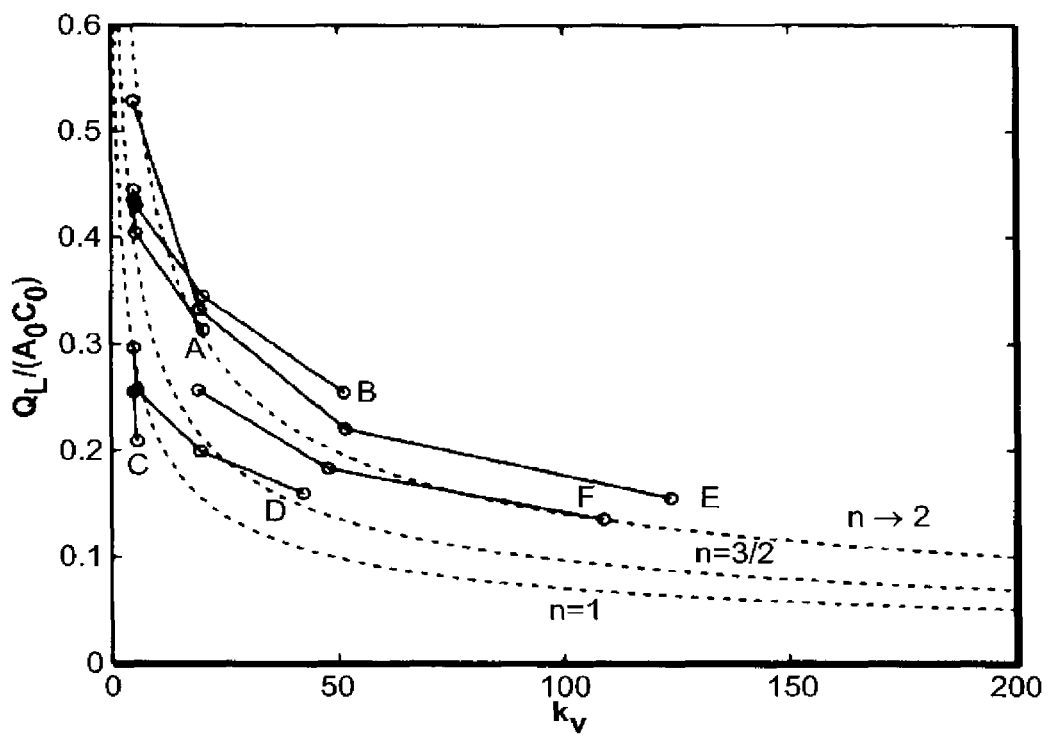
FIG. 7b is a graph comparing limited flow rates from experimental results and from theory.

FIG. 7b compares predicted versus measured maximum flow rates. Flow rate was found to decrease with higher k, as the valve resistance acts in series with the flexible tube resistance. The general trend is well predicted by Eqn. (8), and experimental and theoretical results are of the same order of magnitude. In particular, the model with n→2 matches the small diameter tube experiments and n=3/2 better describes the flow rates of the large diameter tubes.

In this disclosure, a modified Starling resistor is disclosed to design a passive, self-regulating valve. A needle valve was introduced in the traditional Starling resistor allowing the flow rate and activation pressure to be controlled separately. The flow limitation phenomenon can be used to self-regulate the flow rate with a very low pumping pressure.

A series of experiments were conducted to find a reliable way to control the activation pressure and the flow rate. Two flow limitation modes were found: in Mode 1, self-induced oscillation occurs at the peak of the flow rate; and in Mode 2, it happens after a regime of steady collapse. Various key parameters were also examined, including the inner diameter, the length and the wall thickness of the tube. We found that 1) the inner diameter is the determining factor to the limitation mode: the small diameter tube has Mode 1 and the big diameter tube has Mode 2; 2) the length is able to increase the time-averaged flow rate in the oscillation part of the flow limitation but not in steady state; and 3) a thicker tube wall increases the limited flow rate and the activation pressure. A lumped-parameter model was developed to capture the magnitude and trend of the flow limitation observed in experiments at various tube geometries. The trend and magnitude of the experimental results are well predicted by the lumped parameter model.

The new architecture disclosed herein is able to control separately the activation pressure and flow rate through the needle valve. The tube geometry determines the activation pressure and the needle valve or flow restrictor determines the flow rate. Experiments were performed to quantify the needle valve's effect and a parametric investigation of tube geometry on flow limitation was performed to clarify the mechanism to adjust the activation pressure. The examined factors include inner diameter, length and wall thickness of the elastic tube. A lumped-parameter model captures the magnitude and trend of the flow limitation.

It is recognized that modifications and variations of the invention will be apparent to those of ordinary skill in the art and it is intended that all such modifications and variations be included within the scope of the appended claims.

REFERENCES

[1] Patterson, S. W., and Starling, E. H., 1914. "On the mechanical factors which determine the output of the ventricles.". The Journal of Physiology, 48(5), pp. 357-379.

[2] Zimoch, P. J., Tixier, E., Joshi, A., Hosoi, A. E., and Winter, A. G., 2013. "Bio-Inspired, low-cost, self-regulating valves for drip irrigation in developing countries". In Volume 5: 25th International Conference on Design Theory and Methodology, p. V005T06A040.

[3] Bertram, C. D., 2003. "Experimental studies of collapsible tubes". In Flow Past Highly Compliant Boundaries and in Collapsible Tubes. pp. 51-65.

[4] Grotberg, J. B., and Jensen, O. E., 2004. "Biofluid mechanics in flexible tubes". Annual Review of Fluid Mechanics, 36(1), January, pp. 121-147.

[5] Heil, M., and Hazel, A. L., 2011. "Fluid-Structure Interaction in Internal Physiological Flows". Annual Review of Fluid Mechanics, 43(1), January, pp. 141-162.

[6] Brower, R. W., and Noordergraaf, A., 1973. "Pressure-flow characteristics of collapsible tubes: A reconciliation of seemingly contradictory results". Annals of Biomedical Engineering, 1(3), March, pp. 333-355.

[7] Gavriely, N., Shee, T. R., Cugell, D. W., and Grotberg, J. B., 1989. "Flutter in flow-limited collapsible tubes: a mechanism for generation of wheezes.". Journal of Applied Physiology, 66(5), pp. 2251-2261.

[8] Bertram, C. D., and Castles, R. J., 1999. "Flow limitation in uniform thick-walled collapsible tubes". Journal of Fluids and Structures, 13(3), pp. 399-418.

[9] Bertram, C. D., and Elliott, N. S. J., 2003. "Flow-rate limitation in a uniform thin-walled collapsible tube, with comparison to a uniform thick-walled tube and a tube of tapering thickness". Journal of Fluids and Structures, 17(4), March, pp. 541-559.

[10] Bertram, C. D., and Chen, W., 2000. "Aqueous flow limitation in a tapered-stiffness collapsible tube". Journal of Fluids and Structures, 14(8), November, pp. 1195-1214.

[11] Bertram, C. D., and Tscherry, J., 2006. "The onset of flow-rate limitation and flow-induced 365 oscillations in collapsible tubes". Journal of Fluids and Structures, 22(8), November, pp. 1029-1045.

[12] Low, H., and Chew, Y., 1991. "Pressure/flow relationships in collapsible tubes: effects of upstream pressure fluctuations". Medical and Biological Engineering and Computing, 29, pp. 217-221.

[13] Low, T. H., Chew, Y. T., Winoto, S. H., and Chin, R., 1995. "Pressure/flow behaviour in collapsible tube subjected to forced downstream pressure fluctuations". Medical and Biological Engineering and Computing, 33(4), pp. 545-550.

[14] Walsh, C., Sullivan, P. A., Hansen, J., and Chen, L.-W., 2007. "Measurement of wall deformation and flow limitation In a mechanical trachea". Journal of Biomechanical Engineering, 117(1), October, p. 146.

[15] Bertram, C. D., Raymond, C. J., and Pedley, T. J., 1990. "Mapping of instabilities for flow through collapsed tubes of differing length". Journal of Fluids and Structures, 4(2), pp. 125-153.

[16] Shapiro, A. H., 1977. "Steady flow in collapsible tubes". Journal of Biomechanical Engineering, 99(3), p. 126.

[17] Flaherty, J. E., Keller, J. B., and Rubinow, S. I., 1972. "Post buckling behavior of elastic tubes and rings with opposite sides in contact". SIAM Journal on Applied Mathematics, 23(4), pp. 446-455.

What is claimed is:

1. A passive, self-regulating valve comprising:
a static pressure chamber;
an elastically collapsible tube supported within the static pressure chamber, the elastically collapsible tube being defined by a geometry that determines an activation pressure of the valve;
a flow restrictor in fluid communication with the elastically collapsible tube inside the static pressure chamber; and
piping connecting a source of pressurized liquid both to the flow restrictor and to an opening into the static pressure chamber, the piping enabling flow restrictor to control flow rate of the pressurized liquid through the valve independent of the activation pressure of the valve.

2. The passive, self-regulating valve of claim 1, wherein the flow restrictor is a needle valve.

3. The passive, self-regulating valve of claim 1, wherein the flow restrictor is a tortuous path, an orifice, or other flow restrictor.

4. The passive, self-regulating valve of claim 1, wherein the geometry of the collapsible tube includes an inner diameter in a range of approximately 0.6-1.3 cm.

5. The passive, self-regulating valve of claim 4, wherein the inner diameter is approximately 0.6 cm.

6. The passive, self-regulating valve of claim 1, wherein the geometry of the elastically collapsible tube includes a wall thickness in a range of approximately 0.8-2.4 mm.

7. The passive, self-regulating valve of claim 6, wherein the wall thickness is approximately 2.4 mm.

8. The passive, self-regulating valve of claim 1, wherein the geometry of the elastically collapsible tube includes an inner diameter of approximately 0.6 cm and a wall thickness of approximately 2.4 mm.

9. The passive, self-regulating valve of claim 1, wherein the geometry of the elastically collapsible tube includes a length in a range of approximately 22-122 cm.

10. The passive, self-regulating valve of claim 9, wherein the length is approximately 23 cm.

11. The passive, self-regulating valve of claim 1, wherein the elastically collapsible tube is formed using Penrose rubber.

12. The passive, self-regulating valve of claim 1, wherein the elastically collapsible tube is formed of Latex or Silastic rubber.

13. The passive, self-regulating valve of claim 1, wherein the valve is characterized by a normalized activation pressure of approximately 3.

14. The passive, self-regulating valve of claim 1, wherein the valve is characterized by a normalized activation pressure of approximately 3.3.

* * * * *